(12) United States Patent
Naito et al.

(10) Patent No.: US 12,132,242 B2
(45) Date of Patent: Oct. 29, 2024

(54) FUEL CELL STACK (71) Applicant: HONDA MOTOR CO., LTD., Tokyo (JP)

(72) Inventors: Hideharu Naito, Wako (JP); Satoshi Kasagami, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/541,569

(22) Filed: Dec. 3, 2021

(65) Prior Publication Data

US 2022/0181669 A1 Jun. 9, 2022

(30) Foreign Application Priority Data

Dec. 7, 2020 (JP) ................................ 2020-202368

(51) Int. Cl.
| | |
|---|---|
| *H01M 8/2465* | (2016.01) |
| *H01M 8/241* | (2016.01) |
| *H01M 8/242* | (2016.01) |
| H01M 8/10 | (2016.01) |
| H01M 8/2475 | (2016.01) |

(52) U.S. Cl.
CPC ......... *H01M 8/2465* (2013.01); *H01M 8/241* (2013.01); *H01M 8/242* (2013.01); *H01M 2008/1095* (2013.01); *H01M 8/2475* (2013.01); *H01M 2250/20* (2013.01)

(58) Field of Classification Search
None
See application file for complete search history.

(56) References Cited

U.S. PATENT DOCUMENTS

| 11,316,186 | B2 | 4/2022 | Naito et al. | |
|---|---|---|---|---|
| 2010/0143766 | A1 | 6/2010 | Yoshitomi et al. | |
| 2014/0106254 | A1* | 4/2014 | Yamano | H01M 8/2483 |
| | | | | 429/465 |
| 2015/0280268 | A1 | 10/2015 | Naito | |
| 2016/0226092 | A1* | 8/2016 | Nishiyama | H01M 8/241 |
| 2017/0263968 | A1* | 9/2017 | Naito | B60L 50/71 |
| 2018/0309151 | A1* | 10/2018 | Yamaura | H01M 8/2483 |
| 2018/0366761 | A1 | 12/2018 | Ohmori et al. | |
| 2020/0388801 | A1 | 12/2020 | Omura | |

FOREIGN PATENT DOCUMENTS

| CN | 101752589 A | 6/2010 |
|---|---|---|
| CN | 109690818 A | 4/2019 |
| CN | 111755729 A | 10/2020 |

(Continued)

OTHER PUBLICATIONS

Machine English translation of KP2017016770A from Espacenet originally published to Shimomura Jan. 19, 2017 (Year: 2017).*

(Continued)

*Primary Examiner* — Ula C Ruddock
*Assistant Examiner* — Mary Grace Byram
(74) *Attorney, Agent, or Firm* — Carrier, Shende & Associates P.C.; Joseph P. Carrier; Jeffrey T. Gedeon (57) ABSTRACT

A fuel cell stack includes: a cell stack body including a plurality of power generation cells stacked together; and a stack case accommodating the cell stack body. Each of the power generation cells includes a membrane electrode assembly and separators sandwiching the membrane electrode assembly therebetween.

8 Claims, 5 Drawing Sheets

(56) References Cited

FOREIGN PATENT DOCUMENTS

| | | | |
|---|---|---|---|
| JP | 2006-221855 | A | 8/2006 |
| JP | 2010-140667 | A | 6/2010 |
| JP | 2015-185498 | A | 10/2015 |
| JP | 2017016770 | A * | 1/2017 |
| JP | 2018-200858 | A | 12/2018 |
| JP | 2019-003830 | A | 1/2019 |
| JP | 2020-166945 | A | 10/2020 |

OTHER PUBLICATIONS

Office Action dated Jul. 5, 2022 issued over the corresponding Japanese Patent Application No. 2020-202368 with the English translation thereof.

Office Action dated Aug. 24, 2024 issued in the corresponding Chinese Patent Application No. 202111511370.8 with the English machine translation thereof.

* cited by examiner

FUEL CELL STACK

CROSS-REFERENCE TO RELATED APPLICATIONS

This application is based upon and claims the benefit of priority from Japanese Patent Application No. 2020-202368 filed on Dec. 7, 2020, the contents of which are incorporated herein by reference.

BACKGROUND OF THE INVENTION

Field of the Invention

The present invention relates to a fuel cell stack.

Description of the Related Art

In general, a fuel cell stack includes a cell stack body and end plates. The cell stack body is formed by stacking a plurality of power generation cells. The power generation cell includes a membrane electrode assembly and separators sandwiching the membrane electrode assembly. The end plates are disposed at both ends of the cell stack body in the stacking direction. This type of fuel cell stack can be used, for example, as an in-vehicle fuel cell stack. That is, the fuel cell stack can be used by being mounted on a movable mounting body such as a fuel cell vehicle. Such a fuel cell stack used in an in-vehicle manner is particularly likely to be subjected to an external load associated with movement of the vehicle or the like. Then, for example, a fuel cell stack as disclosed in JP 2015-185498 A is known. The fuel cell stack includes a stack case that accommodates the stack body in order to protect the cell stack body from an external load or the like.

SUMMARY OF THE INVENTION

In the fuel cell stack equipped with the stack case that houses the cell stack body, it is desirable to be capable of protecting the cell stack body more suitably by increasing the rigidity of the stack case while preventing the weight of the stack case from increasing.

An object of the present invention is to solve the above-described problems.

According to an aspect of the present invention, there is provided a fuel cell stack including: a cell stack body including a plurality of power generation cells stacked together; and a stack case accommodating the cell stack body, each of the power generation cells including a membrane electrode assembly and separators sandwiching the membrane electrode assembly therebetween, wherein a bottom plate of the stack case has a concavo-convex shape.

In this fuel cell stack, the bottom plate of the stack case is provided with a concavo-convex shape. Accordingly, the rigidity of the stack case can be increased without increasing the thickness of the entire bottom plate (i.e., while suppressing an increase in the weight of the stack case). In the stack case having increased rigidity in this manner, deformation is suppressed even when an external load is applied to the fuel cell stack. Therefore, it is possible to prevent the cell stack body accommodated in the stack case from being deformed. As a result, the cell stack body can be effectively protected from an external load.

The above and other objects, features and advantages of the present invention will become more apparent from the following description when taken in conjunction with the accompanying drawings in which a preferred embodiment of the present invention is shown by way of illustrative example.

DESCRIPTION OF THE INVENTION

In the following drawings, components having the same or similar functions and effects are denoted by the same reference numerals, and repeated description thereof may be omitted.

Figure 1:
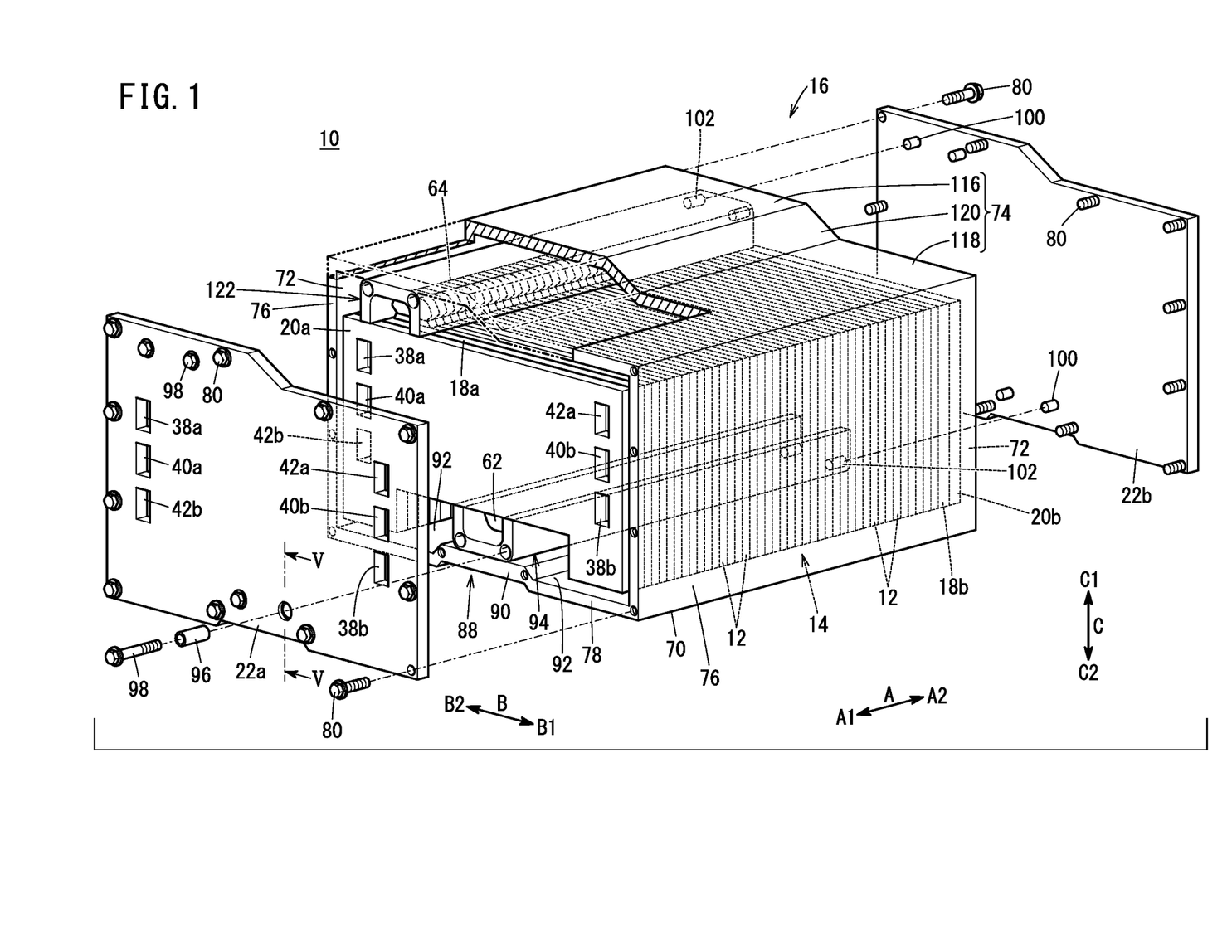
FIG. 1 is a partially exploded perspective view of a fuel cell stack according to an embodiment of the present invention.

A fuel cell stack 10 according to the present embodiment shown in FIG. 1 can be suitably used, for example, as an in-vehicle fuel cell stack mounted on a vehicle such as a fuel cell automobile (not shown). In the following description, the fuel cell stack 10 for use in a vehicle is taken as an example, but the invention is not limited thereto. The fuel cell stack 10 may be used as a stationary type.

The fuel cell stack 10 includes a cell stack body 14 formed by stacking a plurality of power generation cells 12, and a stack case 16 housing the cell stack body 14. A terminal plate 18a, an insulator 20a, and an end plate 22a are disposed toward the outside in this order at one end of the cell stack body 14 in the stacking direction (direction of arrow A). A terminal plate 18b, an insulator 20b, and an end plate 22b are disposed toward the outside in this order at the other end of the plurality of power generation cells 12 in the stacking direction.

The insulators 20a and 20b are made of an insulating material such as polycarbonate (PC) or phenol resin. Each of the insulators 20a and 20b may be formed of a plurality of sheets (for example, two sheets) stacked in the stacking direction. In addition, although not illustrated, a recessed portion 92 that is recessed so as to be separated from the cell stack body 14 may be formed on a surface of the insulator 20a that faces the cell stack body 14. In this case, the terminal plate 18a is disposed in the recessed portion 92. The recessed portion 92 may be formed in a surface of the insulator 20b facing the cell stack body 14, in a manner of being recessed away from the cell stack body 14. In this case, the terminal plate 18b is disposed in the recessed portion 92.

The power generation cell 12 has, for example, a rectangular shape in which the direction of the arrow B is a long-side direction and the direction of the arrow C is a short-side direction. In the cell stack body 14, the long-side direction of the power generation cell 12 is the width direction of the cell stack body 14 (which is orthogonal to both the stacking direction and the up-down direction). In the present embodiment, the length of the cell stack body 14 in the stacking direction (direction of arrow A) is longer than the long side of the power generation cell 12.

Figure 2:
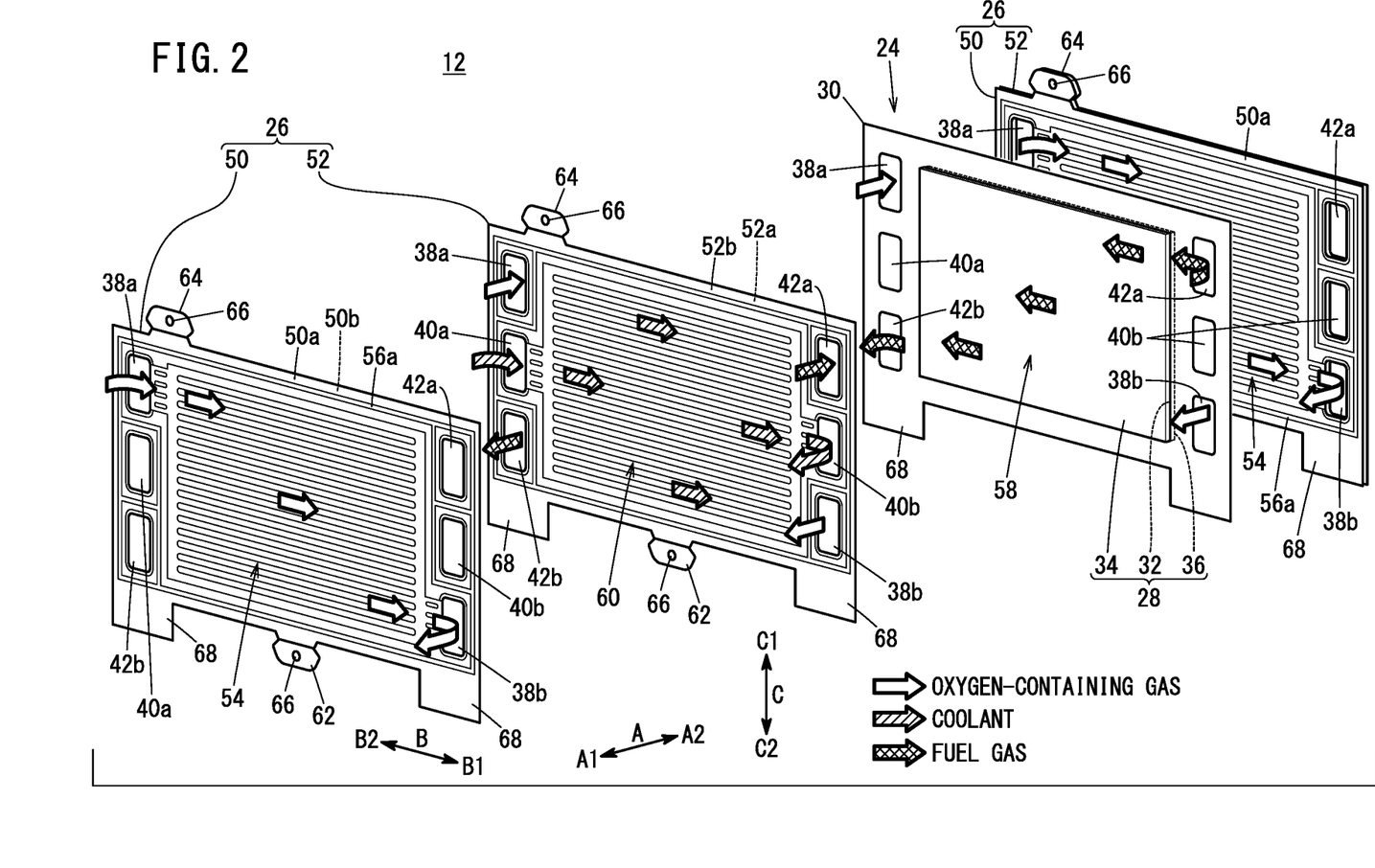
FIG. 2 is an exploded perspective view of a power generation cell.

As shown in FIG. 2, the power generation cell 12 includes a resin frame equipped MEA (membrane electrode assembly) 24 and a pair of separators 26 that sandwich the resin frame equipped MEA 24. In the resin frame equipped MEA 24, the outer periphery of a membrane electrode assembly (MEA) 28 is surrounded by a resin frame member 30. The membrane electrode assembly 28 includes an electrolyte membrane 32, an anode 34, and a cathode 36. The anode 34 is provided on one surface of the electrolyte membrane 32. The cathode 36 is provided on the other surface of the electrolyte membrane 32.

The electrolyte membrane 32 is, for example, a solid polymer electrolyte membrane (cation exchange membrane) such as a thin membrane of perfluorosulfonic acid containing water. The electrolyte membrane 32 is sandwiched between the anode 34 and the cathode 36. As the electrolyte membrane 32, an HC (hydrocarbon) based electrolyte may be used in addition to a fluorine-based electrolyte.

The anode 34 includes an anode catalyst layer and an anode gas diffusion layer, neither of which are shown. The anode catalyst layer is bonded to one surface of the electrolyte membrane 32. The anode gas diffusion layer is laminated on the anode catalyst layer. The cathode 36 includes a cathode catalyst layer and a cathode gas diffusion layer, neither of which are shown. The cathode catalyst layer is bonded to the other surface of the electrolyte membrane 32. The cathode gas diffusion layer is laminated on the cathode catalyst layer.

The anode catalyst layer is formed, for example, by uniformly applying porous carbon particles having a platinum alloy supported on the surface thereof and an ion conductive polymer binder to the surface of the anode gas diffusion layer. The cathode catalyst layer is formed, for example, by uniformly applying porous carbon particles carrying a platinum alloy on the surface thereof and an ion conductive polymer binder to the surface of the cathode gas diffusion layer.

Each of the cathode gas diffusion layer and the anode gas diffusion layer is formed of a conductive porous sheet such as carbon paper or carbon cloth. A porous layer (not shown) may be provided at least one of between the cathode catalyst layer and the cathode gas diffusion layer and between the anode catalyst layer and the anode gas diffusion layer.

The resin frame member 30 has a frame shape. For example, the inner peripheral edge portion of the resin frame member 30 is joined to the outer peripheral edge portion of the membrane electrode assembly 28. By providing the resin frame member 30 on the membrane electrode assembly 28 in this manner, for example, the area of the electrolyte membrane 32 required to form one power generation cell 12 can be reduced. The electrolyte membrane 32 is relatively expensive. Therefore, the material cost of the membrane electrode assembly 28 can be reduced by reducing the area of the electrolyte membrane 32 required to form one power generation cell 12.

The joining structure between the resin frame member 30 and the membrane electrode assembly 28 is not limited to the structure described above. In one example of the joining structure of the resin frame member 30 and the membrane electrode assembly 28, the inner peripheral edge of the resin frame member 30 is sandwiched between the outer peripheral edge of the cathode gas diffusion layer and the outer peripheral edge of the anode gas diffusion layer. In this case, the inner peripheral end surface of the resin frame member 30 may be close to, in contact with, or overlap with the outer peripheral end surface of the electrolyte membrane 32.

In another example of the joining structure between the resin frame member 30 and the membrane electrode assembly 28, the outer peripheral edge portion of the electrolyte membrane 32 protrudes outward from each of the cathode gas diffusion layer and the anode gas diffusion layer. Frame-shaped films are provided on both surfaces of the outer peripheral edge portion of the electrolyte membrane 32. A plurality of frame-shaped films are laminated with the electrolyte membrane 32 interposed therebetween. The laminated frame-shaped films are bonded to each other with an adhesive or the like to form the resin frame member 30.

As shown in FIG. 1, an oxygen-containing gas inlet passage 38a, a coolant inlet passage 40a, and a fuel gas outlet passage 42b are arranged in the vertical direction at one end of each of the power generation cell 12, the end plate 22a, and the insulators 20a and 20b in the long-side direction. A fuel gas inlet passage 42a, a coolant outlet passage 40b, and an oxygen-containing gas outlet passage 38b are arranged in the vertical direction at the other end of each of the power generation cell 12, the end plate 22a, and the insulators 20a and 20b in the long-side direction.

An oxygen-containing gas is supplied to the oxygen-containing gas inlet passage 38a. A coolant (for example, at least one of pure water, ethylene glycol, and oil) is supplied to the coolant inlet passage 40a. A fuel gas (for example, a hydrogen-containing gas) is discharged from the fuel gas outlet passage 42b. The fuel gas is supplied to the fuel gas inlet passage 42a. The coolant is discharged from the coolant outlet passage 40b. The oxygen-containing gas is discharged from the oxygen-containing gas outlet passage 38b.

The oxygen-containing gas inlet passage 38a provided in each of the power generation cells 12, the end plate 22a, and the insulators 20a and 20b in the cell stack body 14 communicates with one another in the stacking direction. That is, the oxygen-containing gas inlet passage 38a extends through the end plate 22a, the insulators 20a and 20b, and the cell stack body 14 in the stacking direction. Similarly, the coolant inlet passage 40a, the fuel gas outlet passage 42b, the fuel gas inlet passage 42a, the coolant outlet passage 40b, and the oxygen-containing gas outlet passage 38b also pass through the end plate 22a, the insulators 20a and 20b, and the cell stack body 14 in the stacking direction.

In this embodiment, each power generation cell 12 is provided with one oxygen-containing gas inlet passage 38a, one coolant inlet passage 40a, one fuel gas outlet passage 42b, one fuel gas inlet passage 42a, one coolant outlet passage 40b, and one oxygen-containing gas outlet passage 38b (hereinafter collectively referred to as "passages"). However, the number of passages provided in each power generation cell 12 is not particularly limited, and may be a single number or a plurality of numbers. The shape and arrangement of the each passage are not limited to those of the present embodiment shown in FIGS. 1 and 2, and can be appropriately modified according to required specifications.

As shown in FIG. 2, the separator 26 is formed by laminating a first bipolar plate 50 and a second bipolar plate 52. The outer periphery of the first bipolar plate 50 and the outer periphery of the second bipolar plate 52 are integrally joined to each other by, for example, welding, brazing, crimping, or the like in a state of being stacked on each other. Each of the first bipolar plate 50 and the second bipolar plate 52 is formed by, for example, corrugating metal thin plates by press forming to have a corrugated shape in cross section. As the metal thin plates, for example, plates such as steel plates, stainless steel plates, aluminum plates, plated steel sheets, titanium plates or metal plates having anti-corrosive surfaces formed thereon by a surface treatment. Each of the first bipolar plate 50 and the second bipolar plate 52 may be made of a carbon material.

The separator 26 is not limited to a structure in which the first bipolar plate 50 and the second bipolar plate 52 are joined together. For example, the separator 26 may be formed of one metal plate. The separator 26 may be formed of a single carbon plate. An insulating resin material may be provided on the outer edge of the separator 26.

The first bipolar plate 50 has an MEA-side surface 50a, which is a surface facing the resin frame equipped MEA 24, and a coolant-side surface 50b, which is a back surface of the MEA-side surface 50a. The second bipolar plate 52 has an MEA-side surface 52a, which is a surface facing the resin frame equipped MEA 24, and a coolant-side surface 52b, which is a back surface of the MEA-side surface 52a.

The MEA-side surface 50a of the first bipolar plate 50 is provided with a plurality of protrusions extending linearly in the direction of arrow B. An oxygen-containing gas flow field 54 is formed by the linearly-extending grooves between the protrusions. Each of the protrusions and the grooves of the oxygen-containing gas flow field 54 may extend in a wavy shape on the separator surface. The oxygen-containing gas flow field 54 is in fluid communication with the oxygen-containing gas inlet passage 38a and the oxygen-containing gas outlet passage 38b, whereby the oxygen-containing gas flows on the oxygen-containing gas flow field 54 in the surface direction of the separator 26 (the arrows B and C).

A metal bead seal 56a projecting toward the resin frame equipped MEA 24 (FIG. 2) is provided on the MEA-side surface 50a of the first bipolar plate 50. The metal bead seal 56a is provided integrally with the first bipolar plate 50 by, for example, press-forming the first bipolar plate 50. Instead of the metal bead seal 56a, a convex elastic seal made of an elastic material may be provided on the MEA-side surface 50a.

A portion of the metal bead seal 56a of the first bipolar plate 50 integrally surrounds the oxygen-containing gas flow field 54, the oxygen-containing gas inlet passage 38a, and the oxygen-containing gas outlet passage 38b. The oxygen-containing gas flow field 54, the oxygen-containing gas inlet passage 38a, and the oxygen-containing gas outlet passage 38b communicate with one another inside a region surrounded by the metal bead seal 56a. The other portions of the metal bead seal 56a individually surround the fuel gas inlet passage 42a, the fuel gas outlet passage 42b, the coolant inlet passage 40a, and the coolant outlet passage 40b. Thus, the metal bead seal 56a prevents the fuel gas and the coolant from flowing into the oxygen-containing gas flow field 54.

Figure 3:
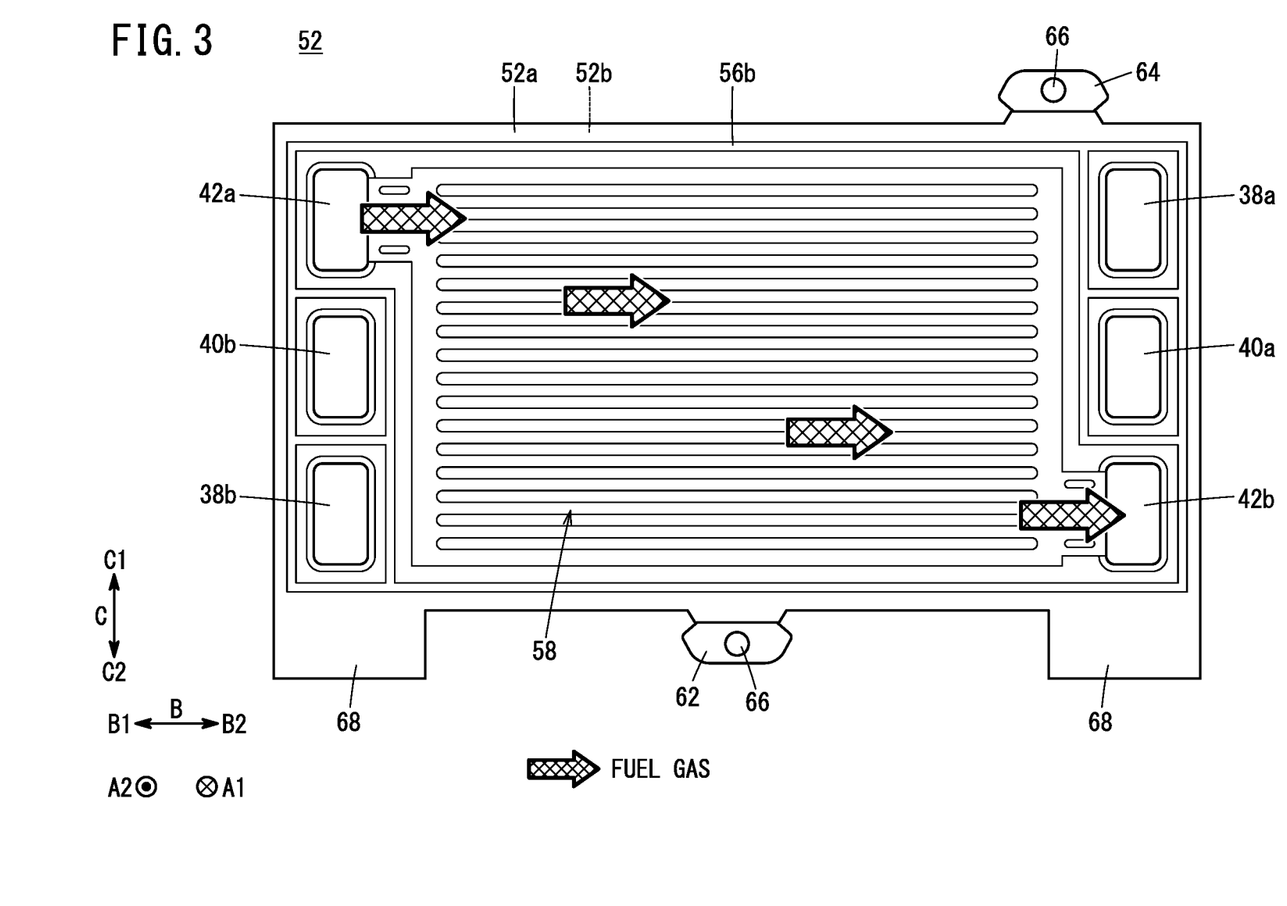
FIG. 3 is a view illustrating an MEA-side surface of a second bipolar plate.

As shown in FIG. 3, the MEA-side surface 52a of the second bipolar plate 52 is provided with a plurality of protrusions extending linearly in the direction of arrow B. A fuel gas flow field 58 is formed by the linearly-extending grooves between the protrusions. Each of the protrusions and the grooves of the fuel gas flow field 58 may extend in a wavy shape. The fuel gas flow field 58 fluidly communicates with the fuel gas inlet passage 42a and the fuel gas outlet passage 42b, thereby allowing the fuel gas to flow in the surface direction of the separator 26 (the directions of arrows B and C).

A metal bead seal 56b projecting toward the resin frame equipped MEA 24 (FIG. 2) is provided on the MEA-side surface 52a of the second bipolar plate 52. The metal bead seal 56b is provided integrally with the second bipolar plate 52 by, for example, press-forming the second bipolar plate 52. Instead of the metal bead seal 56b, a convex elastic seal made of an elastic material may be provided on the MEA-side surface 52a.

A portion of the metal bead seal 56b of the second bipolar plate 52 integrally surrounds the fuel gas flow field 58, the fuel gas inlet passage 42a, and the fuel gas outlet passage 42b. The fuel gas flow field 58, the fuel gas inlet passage 42a, and the fuel gas outlet passage 42b communicate with each other inside a region surrounded by the metal bead seal 56b. The other portions of the metal bead seal 56b individually surround the oxygen-containing gas inlet passage 38a, the oxygen-containing gas outlet passage 38b, the coolant inlet passage 40a, and the coolant outlet passage 40b. Thus, the metal bead seal 56b prevents the oxygen-containing gas and the coolant from flowing into the fuel gas flow field 58.

As shown in FIG. 2, a coolant flow field 60 is provided between the coolant-side surface 50b of the first bipolar plate 50 and the coolant-side surface 52b of the second bipolar plate 52. The coolant flow field 60 fluidly communicates with the coolant inlet passage 40a and the coolant outlet passage 40b. Thus, the coolant flow field 60 allows the coolant to flow in the surface direction of the separator 26 (the direction of arrows B and C).

The coolant flow field 60 is formed by overlapping the back surface of the oxygen-containing gas flow field 54 of the first bipolar plate 50 and the back surface of the fuel gas flow field 58 of the second bipolar plate 52. In addition, the periphery of each passage of the coolant-side surface 50b and the periphery of each passage of the coolant-side surface 52b are joined by, for example, welding, brazing, or the like in a state of facing each other.

Figure 4:
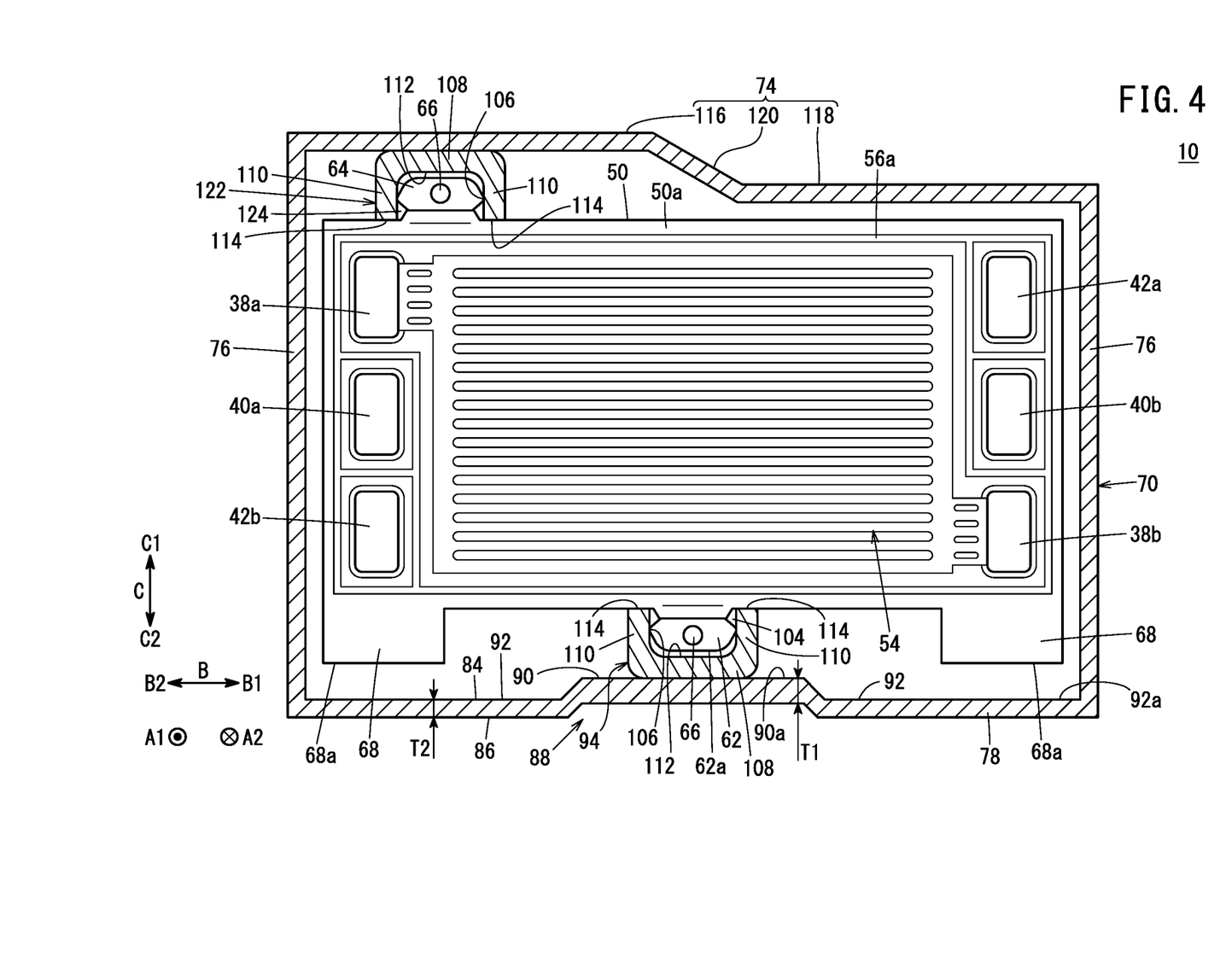
FIG. 4 is a partial transverse cross-sectional view of a fuel cell stack.

As shown in FIGS. 2 to 4, each separator 26 is provided with a bottom tab 62 and an upper tab 64. The bottom tab 62 is disposed substantially at the center of the separator 26 in the long side direction. The bottom tab 62 projects downwardly from the lower edge of the separator 26. In this embodiment, the bottom tab 62 of each separator 26 is provided on each of the first and second bipolar plates 50, 52. As a result, the bottom tab 62 of each separator 26 is made up of one set of two tabs stacked in the stacking direction. However, the bottom tab 62 of each separator 26 may comprise a single tab disposed on only one of the first and second bipolar plates 50, 52.

The bottom tab 62 can be formed, for example, from a material similar to the first bipolar plate 50 and second bipolar plate 52. For example, the bottom tab 62 is formed as a plate separate from the first bipolar plate 50 and then joined to the lower edge of the first bipolar plate 50 by welding or brazing. Similarly, for example, the bottom tab 62 is formed as a plate separate from the second bipolar plate 52 and then joined to the lower edge of the second bipolar plate 52 by welding or brazing. The bottom tab 62 may be integrally formed from the same base material as each of the first bipolar plate 50 and the second bipolar plate 52.

As shown in FIG. 4, both end portions of the bottom tab 62 in the arrow B direction are each formed in a substantially triangular shape. The bottom tab 62 has a symmetrical shape with respect to a center line vertically passing through the B-direction center of the bottom tab 62. A positioning hole 66 is formed in the central portion of the bottom tab 62 in the plane direction (direction of arrows B and C). A rod (not shown) for positioning the plurality of power generation cells 12 at the time of manufacturing the fuel cell stack 10 (at the time of stacking the plurality of power generation cells 12) is inserted through the positioning hole 66. The rod is extracted from the positioning hole 66 after the stacking of the plurality of power generation cells 12 is completed. However, the rod may be left in the positioning hole 66 even after completion of manufacturing of the fuel cell stack 10.

An insulating resin (not shown) may be provided on each of the outer periphery of the bottom tab 62 and the inner periphery of the positioning hole 66. The insulating resin in this case is not particularly limited as long as it has electrical insulating property. Suitable examples of the insulating resin include polycarbonate, polyphenylene sulfide, polysulfone, fluorine resin, and materials similar to those of the insulators 20a and 20b.

The upper tab 64 is configured substantially similar to the bottom tab 62, except as described below. Therefore, a detailed description of the upper tab 64 will be omitted. The upper tab 64 is disposed closer to one end portion (end portion in the arrow B2 direction) than to the center of the separator 26 in the long side direction. The upper tab 64 projects upwardly from the upper edge of the separator 26. The bottom tabs 62 and the upper tabs 64 provided in each power generation cell 12 are arranged in a row along the stacking direction of the cell stack body 14 to form a tab row.

Protruding portions 68 that protrude downward are provided at both end portions of each separator 26 in the long-side direction (arrow B direction). Therefore, in the outer shape of the separator 26 as viewed in the stacking direction, except for the bottom tab 62 and the upper tab 64, the vertical dimension (vertical length) of horizontal end portions of the separator 26 is longer than the vertical dimension (vertical length) of the horizontal central portion. A lower end surface 68a of the protruding portion 68 is positioned below a lower end surface 62a of the bottom tab 62.

As shown in FIG. 1, the stack case 16 includes a peripheral wall case 70 and end plates 22a and 22b. The peripheral wall case 70 surrounds the outer periphery of the cell stack body 14 except for both ends in the stacking direction. As described above, the end plates 22a and 22b are disposed at both ends of the cell stack body 14 in the stacking direction. That is, the end plates 22a and 22b constitute part of the stack case 16. In the present embodiment, the peripheral wall case 70 has a rectangular tube shape having openings 72 provided at both ends in the stacking direction. Therefore, the peripheral wall case 70 includes an upper plate 74, a pair of side plates 76, and a bottom plate 78. The peripheral wall case 70 is formed as an integral structure by, for example, extrusion processing or casting.

The configuration of the stack case 16 is not particularly limited to the above. For example, an opening (not shown) that exposes the cell stack body 14 may be provided in any of the upper plate 74, the pair of side plates 76, and the bottom plate 78 of the peripheral wall case 70. In this case, the stack case 16 further includes a closing panel (not shown) that detachably closes the opening. By removing the closing panel from the peripheral wall case 70 to open the opening, it is possible to easily access the cell stack body 14 after being housed in the stack case 16. Another aspect of the peripheral wall case 70 may include an upper plate, a pair of side plates, and a bottom plate that are separate components from each other. In this case, the upper plate, the pair of side plates, and the bottom plate are joined together via bolts or the like, to thereby assemble the rectangular tubular peripheral wall case 70.

The pair of end plates 22a and 22b sandwich, in the stacking direction, the cell stack body 14 accommodated in the peripheral wall case 70. Each of the end plates 22a and 22b is joined to the peripheral edge portion of the opening 72 of the peripheral wall case 70 by bolts 80. A seal member 82 (FIG. 5) made of an elastic material is interposed between each of the end plates 22a and 22b and the peripheral wall case 70 along the outer periphery of the opening 72.

As described above, by attaching each of the end plates 22a and 22b to the peripheral wall case 70, the openings 72 of the peripheral wall case 70 are closed. Thus, an accommodation space is formed inside the stack case 16. In the accommodation space, the cell stack body 14, the insulators 20a and 20b, and the terminal plates 18a and 18b are accommodated in a state of being sandwiched between the pair of end plates 22a and 22b. At this time, a tightening load in the stacking direction is applied to the cell stack body 14 via the pair of end plates 22a and 22b. The tightening load can suppress leakage of fuel gas or the like to the outside of the cell stack body 14 during power generation of the fuel cell stack 10. In addition, an appropriate surface pressure can be applied to the power generation surface of the power generation cell 12 by the tightening load. The tightening load can be adjusted by adjusting the thickness of the insulators 20a and 20b, arranging shims (spacers), or the like.

The outer peripheral surface of the cell stack body 14 accommodated in the stack case 16 as described above may be separated from the inner wall surface of the peripheral wall case 70.

As shown in FIG. 4, the bottom plate 78 of the peripheral wall case 70 has a bottom plate inner surface 84 facing the cell stack body 14 and a bottom plate outer surface 86, which is the back surface of the bottom plate inner surface 84. The width direction (arrow B direction) of the bottom plate 78 is defined as a direction perpendicular to both the thickness direction (vertical direction, arrow C direction) of the bottom plate 78 and the stacking direction (arrow A direction) of the cell stack body 14.

The bottom plate 78 is provided with a concavo-convex shape 88. The concavo-convex shape 88 has a convex portion 90. The convex portion 90 is provided on the bottom plate inner surface 84 of the bottom plate 78 and protrudes toward the cell stack body 14. The convex portion 90 is a protrusion extending along the stacking direction substantially at the center of the bottom plate 78 in the width direction. As viewed from the bottom plate outer surface 86 of the bottom plate 78, the convex portion 90 has a groove shape which is recessed toward the cell stack body 14 and extends along the stacking direction.

The concavo-convex shape 88 has recessed portions 92. The recessed portions 92 are formed integrally with the convex portion 90 on both sides of the convex portion 90 of the bottom plate 78 in the width direction. As viewed from the bottom plate inner surface 84 of the bottom plate 78, the recessed portions 92 are recessed so as to be separated from the cell stack body 14. As viewed from the bottom plate inner surface 84 of the bottom plate 78, the recessed portions 92 each have a groove shape extending along the stacking direction. On the other hand, as viewed from the bottom plate outer surface 86 of the bottom plate 78, the recessed portions 92 protrude so as to be separated from the cell stack body 14. Further, as viewed from the bottom plate outer surface 86 of the bottom plate 78, the recessed portions 92 each are a projection extending along the stacking direction. In the stack case 16, the protruding portions 68 of each separator 26 of the cell stack body 14 protrude toward the recessed portions 92 of the bottom plate 78. A gap is formed between a bottom surface 92a of each recessed portion 92 of the bottom plate inner surface 84 and the lower end surface 68a of each protruding portion 68.

The thickness T1 of a central portion of the bottom plate 78 in the width direction is thicker than the thickness T2 of both end portions of the bottom plate 78 in the width direction. That is, the portion of the bottom plate 78 forming the convex portion 90 is thicker than the portion of the bottom plate 78 forming the recessed portion 92.

Figure 5:
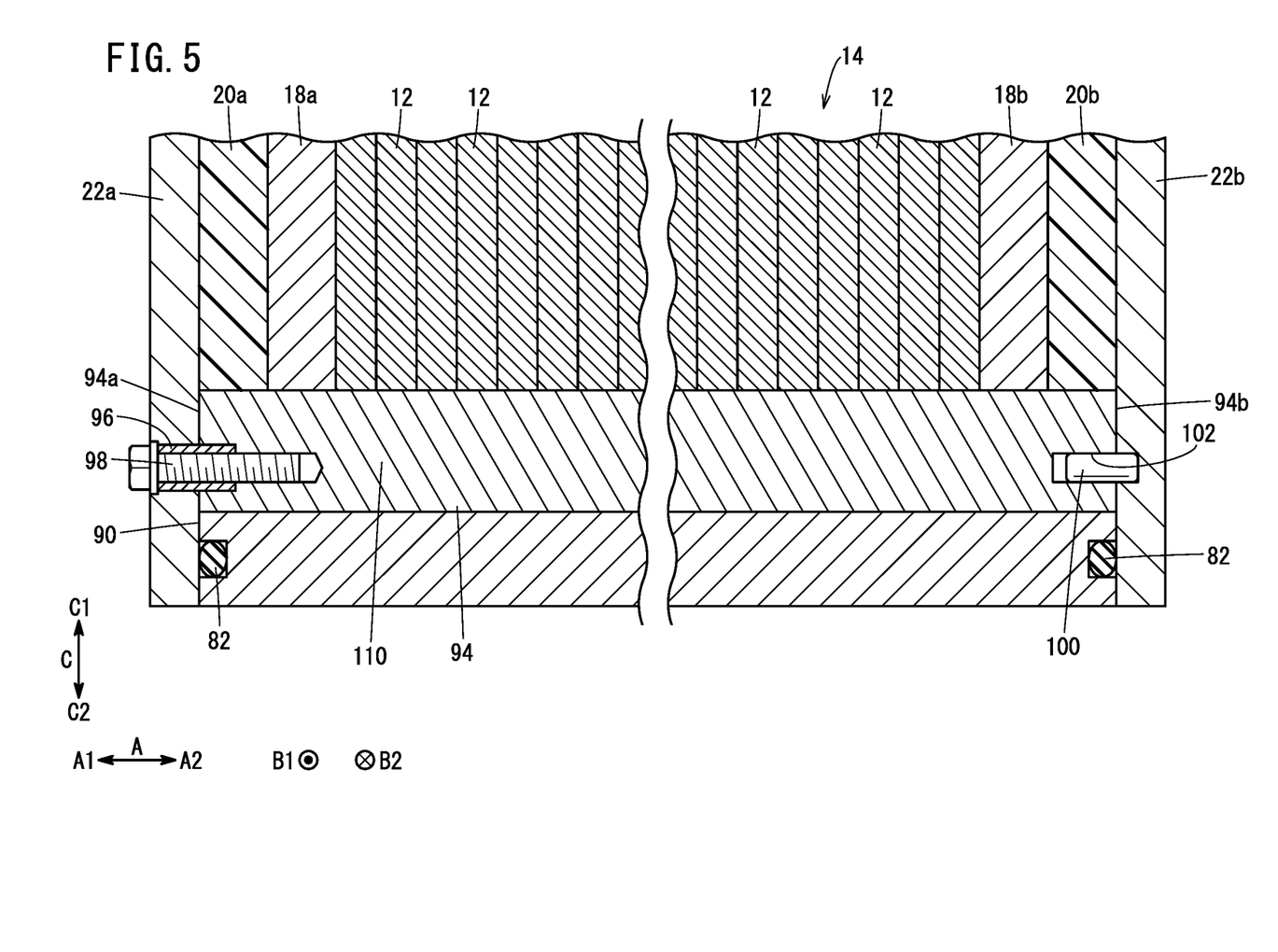
FIG. 5 is a cross-sectional view taken along line V-V of FIG. 1.

As shown in FIGS. 1 and 4, a bottom support bar 94 is provided between an upper end surface 90a of the convex portion 90 of the bottom plate 78 and a lower end surface 62a of the bottom tab 62 (tab row) of the cell stack body 14. As shown in FIGS. 1 and 5, the bottom support bar 94 extends along the stacking direction between the pair of end plates 22a and 22b. Examples of the material forming the bottom support bar 94 include a metal material (aluminum, iron, or the like) coated with an insulating resin and an insulating resin material.

As shown in FIGS. 1 and 5, in the present embodiment, one end portion (end portion in the arrow A1 direction) of the bottom support bar 94 in the extending direction is joined to the end plate 22a via a hollow knock pin 96 and a fastening bolt 98. In this case, the position of the one end surface 94a of the bottom support bar 94 and the position of the end plate 22a are fixed to each other in a state where the one end surface 94a and the end plate 22a are in contact with each other without a gap therebetween.

In addition, the other end portion (end portion in the arrow A2 direction) in the extending direction of the bottom support bar 94 is supported by the end plate 22b via a pair of solid pins 100. In this case, the bottom support bar 94 is supported so as to be relatively movable in the arrow A direction with respect to the end plate 22b. Specifically, a pin insertion hole 102 along the extending direction is provided at the other end portion of the bottom support bar 94 in the extending direction. An end portion of the pin 100 in the arrow A2 direction is fixed to the end plate 22b. On the other hand, an end portion of the pin 100 in the arrow A1 direction is fitted into the pin insertion hole 102 of the bottom support bar 94 so as to be movable in the axial direction. The length of the bottom support bar 94 in the extending direction may be set slightly shorter than the distance between the pair of end plates 22a and 22b joined to the peripheral wall case 70.

The other end surface 94b of the bottom support bar 94 and the end plate 22b can approach each other along the direction of the arrow A. The other end surface 94b of the bottom support bar 94 and the end plate 22b can be separated from each other so as to form a gap therebetween. The other end surface 94b of the bottom support bar 94 and the end plate 22b are restricted from moving relative to each other in a direction (radial direction of the pin 100) other than the direction of the arrow A.

As described above, the other end surface 94b of the bottom support bar 94 is movable relative to the end plate 22b in the stacking direction. Therefore, even if the bottom support bar 94 is provided between the pair of end plates 22a and 22b, it is possible to avoid a configuration in which the bottom support bar 94 applies a tightening load to the cell stack body 14. As a result, the rigidity required for the bottom support bar 94 in the stacking direction can be reduced. Consequently, the weight of the bottom support bar 94 can be reduced.

As shown in FIG. 4, a bottom tab insertion portion 104 is provided on an upper surface portion of the bottom support bar 94. The bottom tab insertion portion 104 has a concave shape into which the bottom tab 62 is inserted. Both ends in the width direction, of the bottom tab 62 inserted into the bottom tab insertion portion 104 abut against an inner wall surface 106 of the bottom tab insertion portion 104.

In the present embodiment, the bottom tab insertion portion 104 is formed in a manner of extending from one end to the other end in the extending direction of the bottom support bar 94. The bottom tab insertion portion 104 has a groove shape capable of accommodating the tab row of the bottom tab 62. Specifically, the bottom tab insertion portion 104 is formed by a base portion 108 and a pair of upstanding portions 110. The base portion 108 has an upper surface 112. The upper surface 112 faces, in the up-down direction, the lower end surface 62a of the bottom tab 62 inserted into the bottom tab insertion portion 104 at a distance from each other.

The pair of upstanding portions 110 protrude toward the cell stack body 14 from both sides of the base portion 108 in the width direction. The bottom tab insertion portion 104 is provided between the pair of upstanding portions 110. The pair of upstanding portions 110 have inner peripheral surfaces (inner wall surfaces 106) facing each other across the bottom tab 62 in the width direction. The pair of inner peripheral surfaces (inner wall surfaces 106) abut against both end portions in the width direction, of the bottom tab 62.

An upper end of each upstanding portion 110 is provided with a contact surface 114 that contacts the cell stack body 14. Therefore, the bottom support bar 94 receives the weight of the cell stack body 14 via the contact surface 114. The bottom support bar 94 is curved as a result of receiving the weight of the cell stack body 14. Accordingly, the lower end surface of the bottom support bar 94 (base portion 108) comes into contact with the upper end surface 90a of the convex portion 90. In addition, it is preferable that a curved shape is given to corners (connection portions between the upper surface 112 and the inner wall surface 106) of both ends in the width direction of the bottom tab insertion portion 104. It is preferable that a contact portion of the separator 26 that is in contact with the contact surface 114 is covered with an insulating resin (not shown).

The upper plate 74 of the peripheral wall case 70 includes a first upper plate portion 116, a second upper plate portion 118, and an inclined portion 120. The first upper plate portion 116 is connected to an end portion of the inclined portion 120 in the arrow B2 direction. The second upper plate portion 118 is connected to an end portion of the inclined portion 120 in the arrow B1 direction. The upper end surface of the first upper plate portion 116 is positioned at a level higher than the upper end surface of the second upper plate portion 118. Therefore, the inclined portion 120 connecting the first upper plate portion 116 and the second upper plate portion 118 is inclined with respect to the width direction. The end portion of the inclined portion 120 in the direction of the arrow B2 is positioned at a level higher than the end portion in the direction of the arrow B1.

Since the first upper plate portion 116 is disposed at a position higher than the second upper plate portion 118 as described above, an accommodation space is formed between the cell stack body 14 in the stack case 16 and the first upper plate portion 116. The upper tab 64, an upper support bar 122, a bus bar (not shown), and the like are accommodated in the accommodation space. On the other hand, a space in which, for example, an electrical unit or the like (not illustrated) is disposed is formed above the second upper plate portion 118.

Electric power generated by the power generation cell 12 is supplied to the electrical unit via the bus bar.

The upper support bar 122 is disposed between the upper tab 64 (tab row) of the cell stack body 14 and the first upper plate portion 116 of the upper plate 74. The upper support bar 122 extends along the stacking direction between the pair of end plates 22a and 22b. The upper support bar 122 may be formed from a material similar to the bottom support bar 94. Similarly to the bottom support bar 94, one end of the upper support bar 122 in the extending direction is fixed to the end plate 22a, and the other end thereof is supported so as to be movable relative to the end plate 22b in the direction of arrow A.

A lower surface portion of the upper support bar 122 is provided with an upper tab insertion portion 124. The upper tab insertion portion 124 has a concave shape into which the upper tab 64 is inserted. The upper tab insertion portion 124 and the bottom tab insertion portion 104 can be basically configured in the same manner except that their vertical directions are reversed. That is, the upstanding portion 110 forming the upper tab insertion portion 124 protrudes downward from the base portion 108. The upstanding portion 110 of the upper tab insertion portion 124 may not have the contact surface 114. That is, the lower end surface of the upstanding portion 110 of the upper tab insertion portion 124 may not be in contact with the cell stack body 14. Also in the upper tab insertion portion 124 of the upper support bar 122, both ends of the upper tab 64 in the width direction are in contact with the inner wall surfaces 106 of the upper tab insertion portion 124.

The operation of the fuel cell stack 10 configured as described above will be briefly described below. As shown in FIGS. 2 and 3, when the fuel cell stack 10 generates power, fuel gas is supplied to the fuel gas inlet passage 42a. The oxygen-containing gas is supplied to the oxygen-containing gas inlet passage 38a. The coolant is supplied to the coolant inlet passage 40a.

As shown in FIG. 2, the oxygen-containing gas is introduced into the oxygen-containing gas flow field 54 through the oxygen-containing gas inlet passage 38a. The oxygen-containing gas introduced into the oxygen-containing gas flow field 54 flows along the oxygen-containing gas flow field 54 in the direction indicated by the arrow B, and is supplied to the cathode 36 on the resin frame equipped MEA 24. On the other hand, as shown in FIG. 3, the fuel gas is introduced into the fuel gas flow field 58 through the fuel gas inlet passage 42a. The fuel gas introduced into the fuel gas flow field 58 is supplied to the anode 34 of the resin frame equipped MEA 24 while moving along the fuel gas flow field 58 in the direction of arrow B.

Therefore, as shown in FIG. 2, in each resin frame equipped MEA 24, the oxygen-containing gas and the fuel gas are consumed by an electrochemical reaction in the cathode electrode catalyst layer and the anode electrode catalyst layer. Thus, power is generated.

The oxygen-containing gas (oxygen-containing exhaust gas) that has not been consumed in the electrochemical reaction flows from the oxygen-containing gas flow field 54 into the oxygen-containing gas outlet passage 38b. The oxygen-containing exhaust gas flowing into the oxygen-containing gas outlet passage 38b flows through the oxygen-containing gas outlet passage 38b in the direction indicated by the arrow A and is discharged from the fuel cell stack 10. Similarly, the fuel gas (fuel exhaust gas) not consumed by the electrochemical reaction flows from the fuel gas flow field 58 into the fuel gas outlet passage 42b. The fuel exhaust gas that has flowed into the fuel gas outlet passage 42b flows through the fuel gas outlet passage 42b in the direction of arrow A and is discharged from the fuel cell stack 10.

The coolant is introduced into the coolant flow field 60 from the coolant inlet passage 40a. The coolant introduced into the coolant flow field 60 exchanges heat with the resin frame equipped MEA 24 while moving in the direction of arrow B along the coolant flow field 60. The coolant after the heat exchange flows into the coolant outlet passage 40b. The coolant that has flowed into the coolant outlet passage 40b flows through the coolant outlet passage 40b in the direction of arrow A and is discharged from the fuel cell stack 10.

The vehicle (not shown) on which the fuel cell stack 10 is mounted can travel by using electric power obtained from the fuel cell stack 10 as described above. When the vehicle is traveling, for example, the vehicle may contact a slope. When the vehicle is traveling, the vehicle may run on a curb, for example. In such cases, in particular, the external load applied from the vehicle to the fuel cell stack 10 tends to increase.

In the fuel cell stack 10 according to the present embodiment, the bottom plate 78 of the stack case 16 is provided with the concavo-convex shape 88. Therefore, the rigidity of the stack case 16 can be increased without increasing the thickness of the entire bottom plate 78 (i.e., while suppressing an increase in the weight of the stack case 16). Since the rigidity of the stack case 16 is increased, deformation of the stack case 16 can be effectively suppressed even when the external load as described above is applied to the fuel cell stack 10. Therefore, the cell stack body 14 housed in the stack case 16 can be prevented from being deformed. As a result, the cell stack body 14 can be effectively protected from an external load.

In the fuel cell stack 10 according to the above-described embodiment, the bottom plate 78 includes a bottom plate inner surface 84 that faces the cell stack body 14 and a bottom plate outer surface 86 which is a back surface of the bottom plate inner surface 84. The direction orthogonal to both a thickness direction of the bottom plate 78 and a stacking direction of the cell stack body 14 is defined as a width direction. The concavo-convex shape 88 includes a convex portion 90 provided on the bottom plate inner surface 84 of the bottom plate 78 and protruding toward the cell stack body 14. The convex portion 90 is a protrusion disposed at a center of the bottom plate 78 in the width direction so as to extend along the stacking direction.

Such a convex portion 90 can be disposed by utilizing, for example, an empty space formed inside the stack case 16. Therefore, for example, it is possible to easily suppress an increase in the outer dimension of the stack case 16, compared to a case where the convex portion 90 is provided on the bottom plate outer surface 86 and the convex portion 90 protrudes toward the outside of the stack case 16.

In addition, as described above, by forming the convex portion 90 as a protrusion disposed at the center of the bottom plate 78 in the width direction so as to extend along the stacking direction, it is possible to effectively suppress deformation of the stack case 16 in a direction intersecting the stacking direction. As a result, it is possible to effectively suppress the occurrence of positional deviation in the power generation cells 12 arranged side by side in the stacking direction in the cell stack body 14. This makes it possible to maintain suitable sealing between the power generation cells 12. As a result, the cell stack body 14 can be more suitably protected from an external load. Note that the convex portion 90 may be configured by a plurality of protrusions or the like provided at intervals in the stacking direction instead of being a protrusion continuously extending in the stacking direction.

In the fuel cell stack 10 according to the embodiment described above, the back side shape of the convex portion 90 is provided on the bottom plate outer surface 86 and is recessed toward the cell stack body 14. In this case, the bottom plate outer surface 86 of the convex portion 90 is recessed toward the cell stack body 14, and the increase in the thickness of the bottom plate 78 can be suppressed accordingly. Therefore, an increase in the weight of the stack case 16 can be more effectively suppressed.

In the fuel cell stack 10 according to the above-described embodiment, the thickness T1 of the bottom plate 78 at the central portion in the width direction is thicker than the thickness T2 of the bottom plate 78 at both end portions in the width direction. In this case, the high rigidity and the weight saving of the stack case 16 can be achieved in a balanced manner. The bottom plate 78 may have the same thickness as a whole. The thickness T1 of the central portion in the width direction of the bottom plate 78 may be thinner than the thickness T2 of both ends in the width direction of the bottom plate 78.

In the fuel cell stack 10 according to the embodiment described above, the pair of end plates 22a and 22b are provided at both ends of the cell stack body 14 in the stacking direction, and the bottom support bar 94 extending between the pair of end plates 22a and 22b in the stacking direction is provided between the upper end surface 90a of the convex portion 90 and the cell stack body 14. The bottom support bar 94 receives the weight of the cell stack body 14 and comes into contact with the upper end surface 90a of the convex portion 90.

In this case, for example, even when an external load is applied to the cell stack body 14 in the gravity direction, deformation of the cell stack body 14 is suppressed via the bottom support bar 94. In addition, for example, even when an external load is applied to the cell stack body 14 in the gravity direction, deformation of the bottom support bar 94 is suppressed since the bottom support bar 94 abuts against the upper end surface 90a of the convex portion 90. Thus, the cell stack body 14 housed in the stack case 16 can be more effectively protected from an external load.

In the fuel cell stack 10 according to the embodiment described above, the bottom tab 62 projecting toward the bottom support bar 94 is provided at the outer edge portion of each separator 26, the bottom support bar 94 is provided with the bottom tab insertion portion 104 having a concave shape into which the bottom tab 62 is inserted, and both ends of the bottom tab 62 in the width direction abut against the inner wall surface 106 of the bottom tab insertion portion 104.

In this case, it is possible to prevent the separators 26 of the power generation cells 12 from being displaced in the width direction, due to contact between both ends of the bottom tab 62 in the width direction and the inner wall surfaces 106 of the bottom tab insertion portion 104. Therefore, even when an external load is applied to the fuel cell stack 10, the sealing performance between the inside and the outside of the cell stack body 14 can be maintained. As a result, the cell stack body 14 accommodated in the stack case 16 can be more effectively protected from an external load.

In a state in which an external load in the width direction is not applied to the cell stack body 14, a gap may be formed between the inner wall surface 106 of the bottom tab insertion portion 104 and both ends of the bottom tab 62 in the width direction. In this case, when an external load in the width direction is applied to the cell stack body 14 and the bottom tab 62 moves relative to the bottom tab insertion portion 104 in the width direction, the inner wall surface 106 of the bottom tab insertion portion 104 and one end of the bottom tab 62 in the width direction come into contact with each other. Thus, the separators 26 of the power generation cells 12 can be prevented from being displaced in the width direction.

In the fuel cell stack 10 according to the above-described embodiment, the bottom tab insertion portion 104 is formed by a base portion 108 having an upper surface 112 facing the lower end surface 62a of the bottom tab 62 inserted into the bottom tab insertion portion 104 at a distance from each other, and a pair of upstanding portions 110 disposed to sandwich the bottom tab 62 in the width direction and protruding from the base portion 108 toward the cell stack body 14. Each of the upstanding portions 110 has an inner wall surface 106 abutting against both ends of the bottom tab 62 in the width direction and a contact surface 114 abutting against the cell stack body 14, and the bottom support bar 94 receives the weight of the cell stack body 14 via the contact surface 114. In this case, it is possible to avoid deformation of the bottom tab 62 caused by receiving at least one of the weight of the cell stack body 14 and an external load in the direction of gravity. Therefore, the durability of the fuel cell stack 10 can be improved.

In the fuel cell stack 10 according to the embodiment described above, the pair of end plates 22a and 22b constitute part of the stack case 16. In this case, the rigidity of the stack case 16 can be increased by the concavo-convex shape 88 of the bottom plate 78. Therefore, even when an external load is applied to the fuel cell stack 10, it is possible to prevent the end plates 22a and 22b from being displaced with respect to the cell stack body 14. Therefore, it is possible to suitably maintain a state in which the tightening load is applied to the cell stack body 14 via the end plates 22a and 22b. In addition, for example, the occurrence of torsion in the cell stack body 14 can be effectively suppressed. As a result, the inside and outside of the cell stack body 14 can be easily maintained in a well-sealed state.

The pair of end plates 22a and 22b may not constitute the stack case 16. In this case, for example, the stack case 16 may be configured to surround the outside of the pair of end plates 22a and 22b.

In the fuel cell stack 10 according to the embodiment described above, the concavo-convex shape 88 includes the recessed portions 92 provided on both sides of the bottom plate 78 in the width direction with the convex portion 90 interposed therebetween, the separator 26 has the protruding portion 68 protruding toward the recessed portion 92, and the bottom surface 92a of the recessed portion 92 of the bottom plate inner surface 84 and the lower end surface 68a of the protruding portion 68 are maintained in a state in which a gap is formed therebetween.

In this case, for example, the cell stack body 14 and the stack case 16 can be maintained in an electrically insulated state, regardless of whether or not the outer edge portion of each separator 26 of the cell stack body 14 is subjected to insulation treatment. In particular, in the fuel cell stack 10, as described above, the rigidity of the stack case 16 is increased and deformation is suppressed. Therefore, a state in which a gap is formed between the bottom surface 92a of the bottom plate inner surface 84 of the recessed portion 92 and the lower end surface 68a of the protruding portion 68 can be favorably maintained. As a result, it is possible to simplify the configuration and manufacturing process of the fuel cell stack 10.

It should be noted that the present invention is not limited to the above-described embodiment, and may adopt various configurations without departing from the scope of the present invention.

What is claimed is:

1. A fuel cell stack comprising: a cell stack body including a plurality of power generation cells stacked together; and a stack case accommodating the cell stack body, each of the power generation cells including a membrane electrode assembly and separators sandwiching the membrane electrode assembly therebetween,
wherein a bottom plate of the stack case has a concavo-convex shape,
the bottom plate includes a bottom plate inner surface that faces the cell stack body and a bottom plate outer surface which is a back surface of the bottom plate inner surface,
a direction orthogonal to both a thickness direction of the bottom plate and the stacking direction of the cell stack body is defined as a width direction,
the concavo-convex shape includes a convex portion provided on the bottom plate inner surface of the bottom plate protruding toward the cell stack body and extending along the stacking direction,
a pair of end plates are provided at both ends of the cell stack body in the stacking direction,
a bottom support bar extending between the pair of end plates along the stacking direction is provided between an upper end surface of the convex portion and the cell stack body,
a bottom tab protruding toward the bottom support bar is provided on an outer edge of each of the separators;
the bottom support bar is provided with a bottom tab insertion portion having a concave shape into which the bottom tab is inserted,
the bottom tab insertion portion comprises:
  a base portion including an upper surface that faces a lower end surface of the bottom tab inserted into the bottom tab insertion portion, at a distance from each other;
  a pair of upstanding portions arranged to sandwich the bottom tab in the width direction and protruding from the base portion toward the cell stack body; and
  a pair of contact surfaces provided on the pair of upstanding portions and configured to come into contact with the cell stack body,
a weight of the cell stack body is applied to the bottom support bar through the contact surfaces of the bottom tab insertion portion,
both ends of the bottom tab in the width direction are in contact with an inner wall surface of the bottom tab insertion portion, and
a lower end surface of the bottom support bar is in contact with the upper end surface of the convex portion.

2. The fuel cell stack according to claim 1, wherein:
the convex portion is a protrusion disposed at a center of the bottom plate in the width direction so as to extend along the stacking direction.

3. The fuel cell stack according to claim 1, wherein a back side shape of the convex portion is provided on the bottom plate outer surface and is recessed toward the cell stack body.

4. The fuel cell stack according to claim 2, wherein a thickness of the bottom plate at a central portion in the width direction is thicker than a thickness of the bottom plate at both end portions in the width direction.

5. The fuel cell stack according to claim 1, wherein:
the pair of end plates form part of the stack case.

6. The fuel cell stack according to claim 2, wherein:
the concavo-convex shape includes recessed portions provided on both sides of the bottom plate in the width direction with the convex portion interposed therebetween;
the separator includes protruding portions protruding toward the recessed portions respectively; and
a bottom surface of each of the recessed portions of the bottom plate inner surface and a lower end surface of each of the protruding portions are maintained in a state in which a gap is formed therebetween.

7. The fuel cell stack according to claim 1, wherein at least one end of the bottom support bar has one of a pin or a pin insertion hole that extends in the stacking direction, and at least one of the pair of end plates has another of the pin or the pin insertion hole,
the pin is movably inserted into the pin insertion hole without being screwed in order to support the at least one end of the bottom support bar by the at least one of the pair of end plates in a manner that the bottom support bar is movable relative to the at least one of the pair of end plates in the stacking direction.

8. The fuel cell stack according to claim 7, wherein another end of the bottom support bar is fixed to another of the pair of end plates by a screw.

* * * * *